Jan. 20, 1959  B. J. BECKER, JR., ET AL  2,869,912
CONNECTOR ASSEMBLY FOR A DOOR HANDLE
Filed Nov. 9, 1955

INVENTORS
Bernard J. Becker Jr.
BY & Jean R. Duclos

Paul Fitzpatrick
ATTORNEY

United States Patent Office 2,869,912
Patented Jan. 20, 1959

2,869,912

CONNECTOR ASSEMBLY FOR A DOOR HANDLE

Bernard J. Becker, Jr., Roseville, and Jean Roger Duclos, St. Clair Shores, Mich., assignors to General Motors Corporation, Detroit, Mich., a corporation of Delaware Application November 9, 1955, Serial No. 545,871

4 Claims. (Cl. 292—336.3)

This invention relates to a connector assembly, and more particularly to a connector assembly for an automobile door having a movable window panel.

One feature of the invention is that it provides an improved connector assembly; another feature of the invention is that it provides a connector assembly for an automobile door having a movable window panel, including means for transferring the motion of the latch operating means and/or the latch locking means from one side of the plane of the window panel to the other side thereof; a further feature of the invention is that the connector comprises a frame adapted to be mounted on a panel of the door with arm portions of the frame on opposite sides of the plane in which the window panel lies, and means on the frame for transferring the motion of the latch operating means and/or the latch locking means from one side of the plane of the window panel to the other side thereof; still a further feature of the invention is that the frame of the connector rotatably mounts a pair of spindles which extend across the plane of the window panel, each spindle having a crank on each end, the cranks at one end being connected to the latch and the cranks at the other end being connected to the latch operating means and/or the latch locking means; yet a further feature of the invention is that the connector assembly frame mounts a yieldable bumper for abutting the window when it is lowered; and still another feature of the invention is that the cranks are all of the same size and shape despite the fact that the cranks project at different angles from the spindle.

Other features and advantages of the invention will be apparent from the following description and from the drawings, in which.

Figure 1:
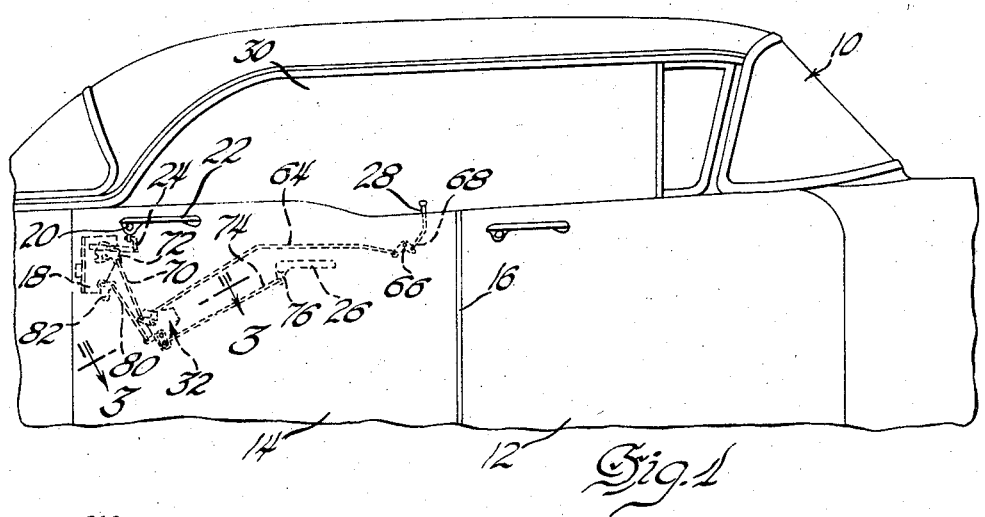
Fig. 1 is a fragmentary side elevational view of an automobile having the improved connector assembly in the rear door.

This connector assembly is particularly designed for automobile doors in which, because of space limitations or for other reasons, the door latch is mounted in the door outside the plane of the door window panel. In such installations the connector assembly facilitates the connections of the inside latch operating means and the inside latch locking means. The assembly could be used in any installation where it is necessary to transfer the motion of a latch operator from one side of the plane of the window panel to the other side of said plane, but the assembly is particularly advantageous when the latch is mounted outside the plane of the window glass because the inside latch operator and inside locking means usually are located remotely from the latch, whereas often the outside operator and outside locking means are located quite closely adjacent the latch and direct operation can be achieved without the use of long connecting rods.

Referring now more particularly to the drawings, 10 represents an automobile having a front door 12 hinged at its front edge and a rear door 14 which is hingedly mounted at its front edge on a center body pillar 16. Adjacent its rear edge the rear door mounts a latch 18 which cooperates in conventional manner with a keeper (not shown) on the automobile body. The latch may be of any known type, as for example, of the type shown in the patent to Leslie et al. 2,641,495 which issued on June 9, 1953. Preferably, however, the latch is of the so-called rotary bolt type and may be of the type shown in the application of James D. Leslie, Serial No. 534,034, entitled "Rotary Bolt Latch." The latch illustrated is mounted in the door outside the plane of the window panel 30 which may be lowered into the door by conventional means.

Figure 2:
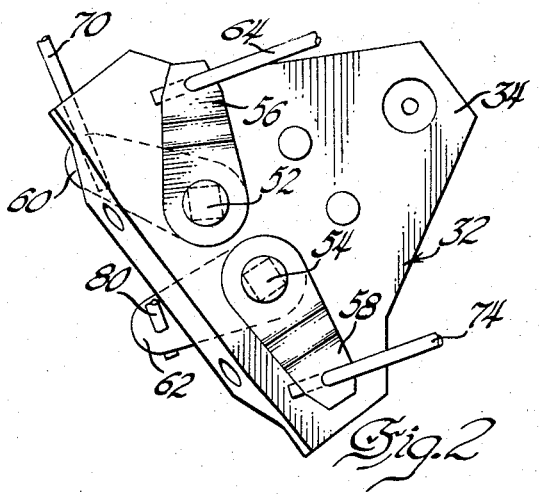
Fig. 2 is an elevation of the connector assembly.
Figure 3:
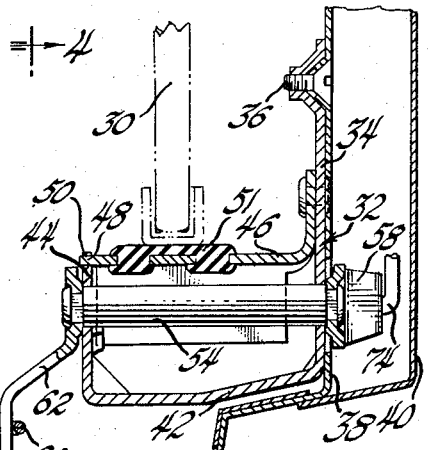
Fig. 3 is a section through the connector assembly taken along the line 3—3 of Fig. 1.
Figure 4:
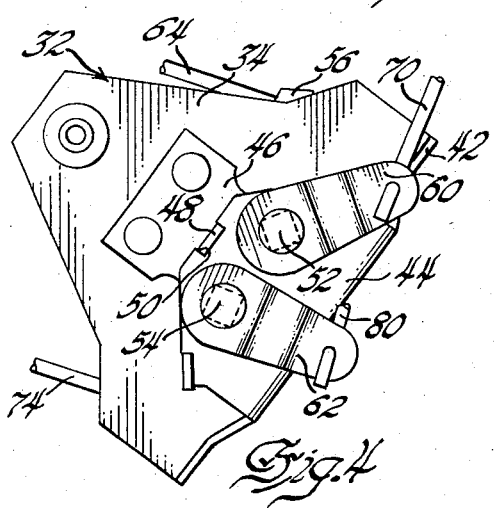
Fig. 4 is a view of the connector assembly similar to Fig. 2 but looking from the opposite side thereof.

The latch may be operated from the outside by a push button 20 mounted in a stationary door handle 22 and connected by a short rod 24 to the door latch. From the inside the latch may be operated by a turn handle 26 mounted on the door inside the automobile passenger compartment, and the latch may be locked from the inside by a conventional garnish molding button 28. Since the latch is located outside the plane of the movable window panel 30, and since the window panel 30 may be lowered down inside the door, it is necessary to transfer the motion of the inside operating means 26 and the inside locking means 28 to the outside of the plane of the window panel 30. The novel connector assembly shown in detail in Figs. 2, 3 and 4 achieves this function.

The connector assembly comprises a U-shaped frame designated generally at 32 having one arm 34 adapted to be mounted by screws 36 to a bracket 38 projecting outwardly from the door outer panel 40 inwardly of the plane of the window panel 30. As shown best in Fig. 3, the frame has a base 42 which extends on opposite sides of the plane in which the window panel 30 lies, and another arm 44 extends generally parallel to the arm 34 outside the plane of the window panel 30. A retainer member 46 is riveted to the arm 34 and extends across the frame to the arm 44, the retainer member having a tongue 48 which fits in a slot 50 in the edge of the arm 44. A yieldable rubber bumper 51 is mounted on the retainer and abuts the edge of the window panel when the window is lowered to cushion the panel. A pair of spindles 52 and 54 are rotatably mounted on the arms 34, 44 and extend therebetween. Each spindle has a square shank portion at each end and a crank is rigidly mounted on each end of each spindle outside the respective arms 34, 44. As shown best in Fig. 2, a crank 56 is mounted on the inner end of the spindle 52 and a crank 58 is mounted on the inner end of the spindle 54, and as shown best in Fig. 4, a crank 60 is mounted on the outer end of the spindle 52 and a crank 62 is mounted on the outer end of the spindle 54. These cranks are disposed in different angular relationships to the respective spindles upon which they are mounted, but all the cranks may be the same size and shape and may be formed from sheet metal stampings, thus effecting an important manufacturing economy in mass production. The crank 56 is connected by a rod 64 to a bell crank 66 (Fig. 1) which is pivoted on the door and which itself is connected by a rod 68 to the garnish molding button 28. At the opposite end of the spindle 52 the crank 60 is connected by a rod 70 to a locking lever 72 on the latch frame. Depression of the garnish molding button 28 will rotate the spindle 52, causing angular movement of the crank 60 and consequent operation of the locking lever 72, the connector assembly serving to transfer the motion of the garnish molding button from inside the plane of the window panel to outside said plane.

The crank 58 on the inner end of the spindle 54 is connected by a rod 74 to a lever 76 which is operated by the inside turn handle 26. At the outer end of spindle 54, the crank 62 is connected by a rod 80 to a latch operating lever 82 on the latch frame. Operation of the inside turn handle will turn the spindle 54 with consequent operation of the latch operating lever 82, the connector assembly transferring the motion of the turn handle 26 from inside of the plane of the window panel to outside said plane. When the window is lowered, its edge seats on the yieldable rubber bumper 51 to cushion the window and avoid rattles.

While we have shown and described one embodiment of our invention, it is capable of many modifications. Changes, therefore, in the construction and arrangement may be made without departing from the spirit and scope of the invention as set forth in the appended claims.

We claim:

1. In an automobile door having a movable window and a latch mounted in the door outside the plane of said window, inside operating means for said latch, inside locking means for said latch, a connector assembly comprising a frame adapted to be mounted on a panel of the door with arm portions of the frame on opposite sides of the plane in which the window panel lies, a pair of spindles rotatably mounted on the frame and extending between said arm portions and a crank on each end of each spindle, means connecting each crank on the outer end of the spindles to the latch, means connecting the crank on the inner end of one spindle to said operating means, and means connecting the crank on the inner end of the other spindle to said locking means, the cranks being all of the same size and shape.

2. In an automobile door having a movable window and a latch mounted in the door outside the plane of said window, inside operating means for said latch, inside locking means for said latch including a push button, outside operating means for said latch including a push button, a connector assembly comprising a U-shaped frame having one arm adapted to be mounted on a panel of the door, a base portion extending on opposite sides of the plane in which the window panel lies and another arm on the opposite side of said plane from said one arm, a pair of spindles rotatably mounted on said arms and extending therebetween, a crank on each end of each spindle, the cranks being all of the same size and shape, means connecting each crank on the outer end of the spindles to the latch, means connecting the crank on the inner end of one spindle to said operating means, means connecting the crank on the inner end of the other spindle to said locking means, and means connecting the outside push button operator directly to the latch.

3. Apparatus of the character claimed in claim 2, wherein there is a retainer member on said frame extending between the arms thereof and a yieldable bumper is mounted on the retainer member for abutting the window.

4. In an automobile door having a movable window and a latch mounted in the door outside the plane of said window, inside operating means for said latch, inside locking means for said latch comprising a push button, a connector assembly comprising a U-shaped frame having one arm adapted to be mounted on a panel of the door, a base portion extending on opposite sides of the plane in which the window panel lies, and another arm on the opposite side of said plane from said one arm, a pair of spindles rotatably mounted on said arms and extending therebetween, a crank on each end of each spindle outside the arms, the cranks being all of the same size and shape, a retainer member on said frame and a yieldable bumper on said retainer member for abutting the window, means connecting each crank on the outer end of the spindles to the latch, means connecting the crank on the inner end of one spindle to said operating means, and means connecting the crank on the inner end of the other spindle to said locking means.

References Cited in the file of this patent

UNITED STATES PATENTS

| 1,465,399 | Kleinsmith | Aug. 21, 1923 |
| 1,639,400 | Devereaux | Aug. 16, 1927 |
| 2,301,559 | Marple | Nov. 10, 1942 |

FOREIGN PATENTS

| 681,564 | France | Feb. 3, 1930 |